US012585554B2

(12) United States Patent
Fujita et al.

(10) Patent No.: US 12,585,554 B2
(45) Date of Patent: Mar. 24, 2026

(54) SERVER GROUP SELECTION SYSTEM, SERVER GROUP SELECTION METHOD, AND PROGRAM

(71) Applicant: NTT, Inc., Tokyo (JP)

(72) Inventors: Katsumi Fujita, Musashino (JP); Masashi Kaneko, Musashino (JP)

(73) Assignee: NTT, Inc., Tokyo (JP)

( * ) Notice: Subject to any disclaimer, the term of this patent is extended or adjusted under 35 U.S.C. 154(b) by 528 days.

(21) Appl. No.: 18/012,131

(22) PCT Filed: Jun. 26, 2020

(86) PCT No.: PCT/JP2020/025170
§ 371 (c)(1),
(2) Date: Dec. 21, 2022

(87) PCT Pub. No.: WO2021/260908
PCT Pub. Date: Dec. 30, 2021

(65) Prior Publication Data
US 2023/0281089 A1 Sep. 7, 2023

(51) Int. Cl.
*G06F 11/14* (2006.01)
*G06F 9/455* (2018.01)
*G06F 11/1482* (2026.01)

(52) U.S. Cl.
CPC ...... *G06F 11/1484* (2013.01); *G06F 9/45558* (2013.01); *G06F 2009/45591* (2013.01); *G06F 2201/815* (2013.01)

(58) Field of Classification Search
None
See application file for complete search history.

(56) References Cited

U.S. PATENT DOCUMENTS

| 2010/0293409 A1 | 11/2010 | Machida |
| 2016/0196157 A1* | 7/2016 | Kodama ................. H04L 43/04 |
| | | 718/1 |
| 2017/0295107 A1 | 10/2017 | Salapura et al. |
| 2018/0260261 A1* | 9/2018 | Mohammed .......... G06F 11/008 |

(Continued)

FOREIGN PATENT DOCUMENTS

| JP | 2011-13822 | 1/2011 |
| JP | 2012-150657 | 8/2012 |

(Continued)

OTHER PUBLICATIONS

Zhou et al., "Cloud Service Reliability Enhancement via Virtual Machine Placement Optimization," IEEE Transactions on Services Computing, 2017, 10(6):902-913.

*Primary Examiner* — Bradley A Teets
*Assistant Examiner* — Melissa A Headly
(74) *Attorney, Agent, or Firm* — Fish & Richardson P.C.

(57) ABSTRACT

A system (S) includes: a classification unit (21) that classifies a plurality of physical servers into a plurality of clusters based on parameters collected from the physical servers; and a destination selection unit (22) that selects, from the plurality of clusters classified by the classification unit (21), any of clusters capable of ensuring resources required for placing virtual machines or containers to be added as a placement destination. Accordingly, the system (S) can determine a server group as the placement destination based on the failure factors of the physical servers.

20 Claims, 10 Drawing Sheets

(56) References Cited

U.S. PATENT DOCUMENTS

2019/0377625 A1* 12/2019 Chintalapati ........... G06N 7/01
2020/0026542 A1 1/2020 Ishii et al.

FOREIGN PATENT DOCUMENTS

| JP | 2016-126562 | 7/2016 |
|----|-------------|--------|
| JP | 2019-511051 | 4/2019 |
| WO | WO 2009/081736 | 7/2009 |
| WO | WO 2015/182471 | 12/2015 |
| WO | WO 2018/181961 | 10/2018 |

* cited by examiner

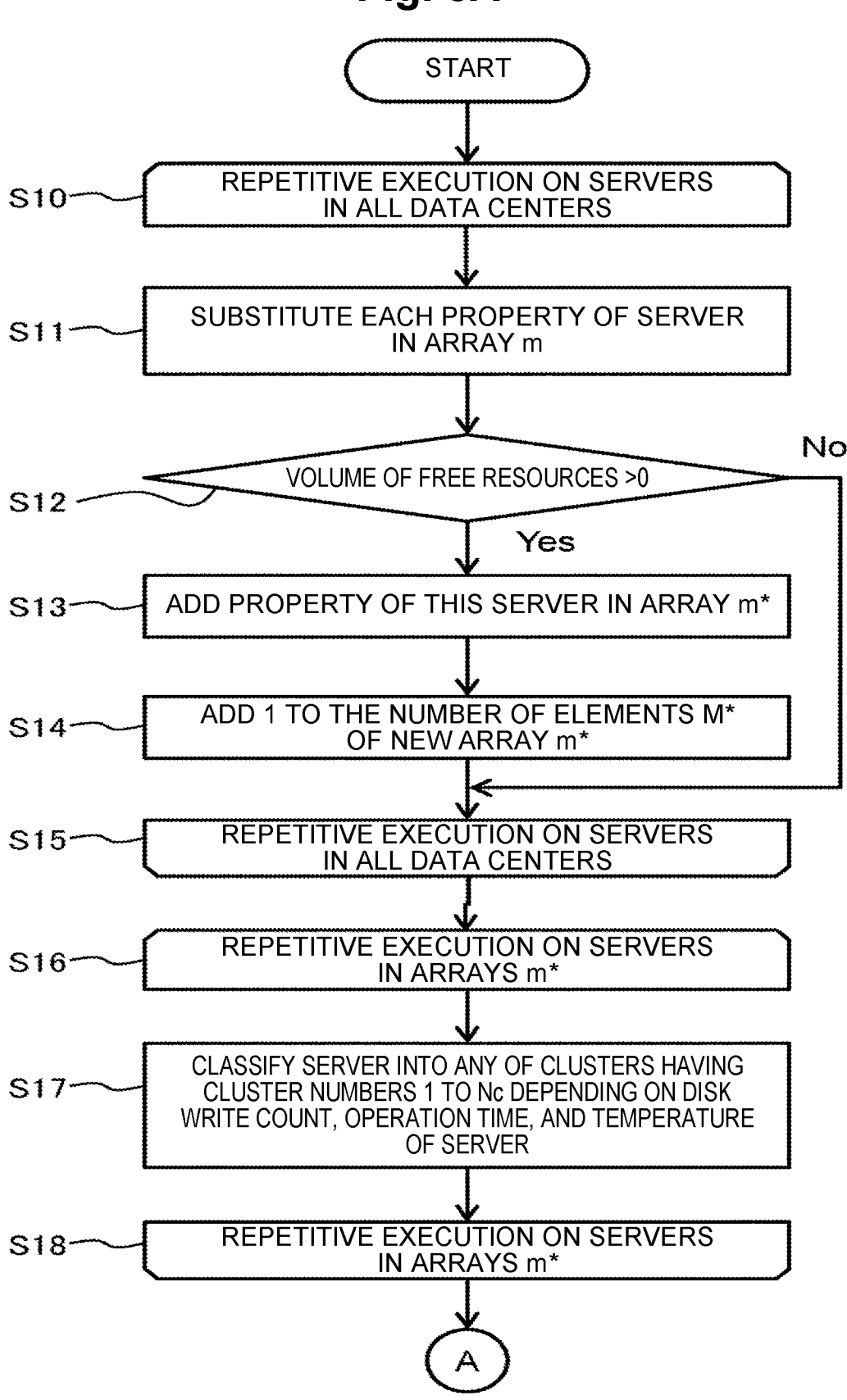

START

S10 — REPETITIVE EXECUTION ON SERVERS
IN ALL DATA CENTERS

S11 — SUBSTITUTE EACH PROPERTY OF SERVER
IN ARRAY m

S12 — VOLUME OF FREE RESOURCES >0     No

Yes

S13 — ADD PROPERTY OF THIS SERVER IN ARRAY m*

S14 — ADD 1 TO THE NUMBER OF ELEMENTS M*
OF NEW ARRAY m*

S15 — REPETITIVE EXECUTION ON SERVERS
IN ALL DATA CENTERS

S16 — REPETITIVE EXECUTION ON SERVERS
IN ARRAYS m*

S17 — CLASSIFY SERVER INTO ANY OF CLUSTERS HAVING
CLUSTER NUMBERS 1 TO Nc DEPENDING ON DISK
WRITE COUNT, OPERATION TIME, AND TEMPERATURE
OF SERVER

S18 — REPETITIVE EXECUTION ON SERVERS
IN ARRAYS m*

Figure 8C:
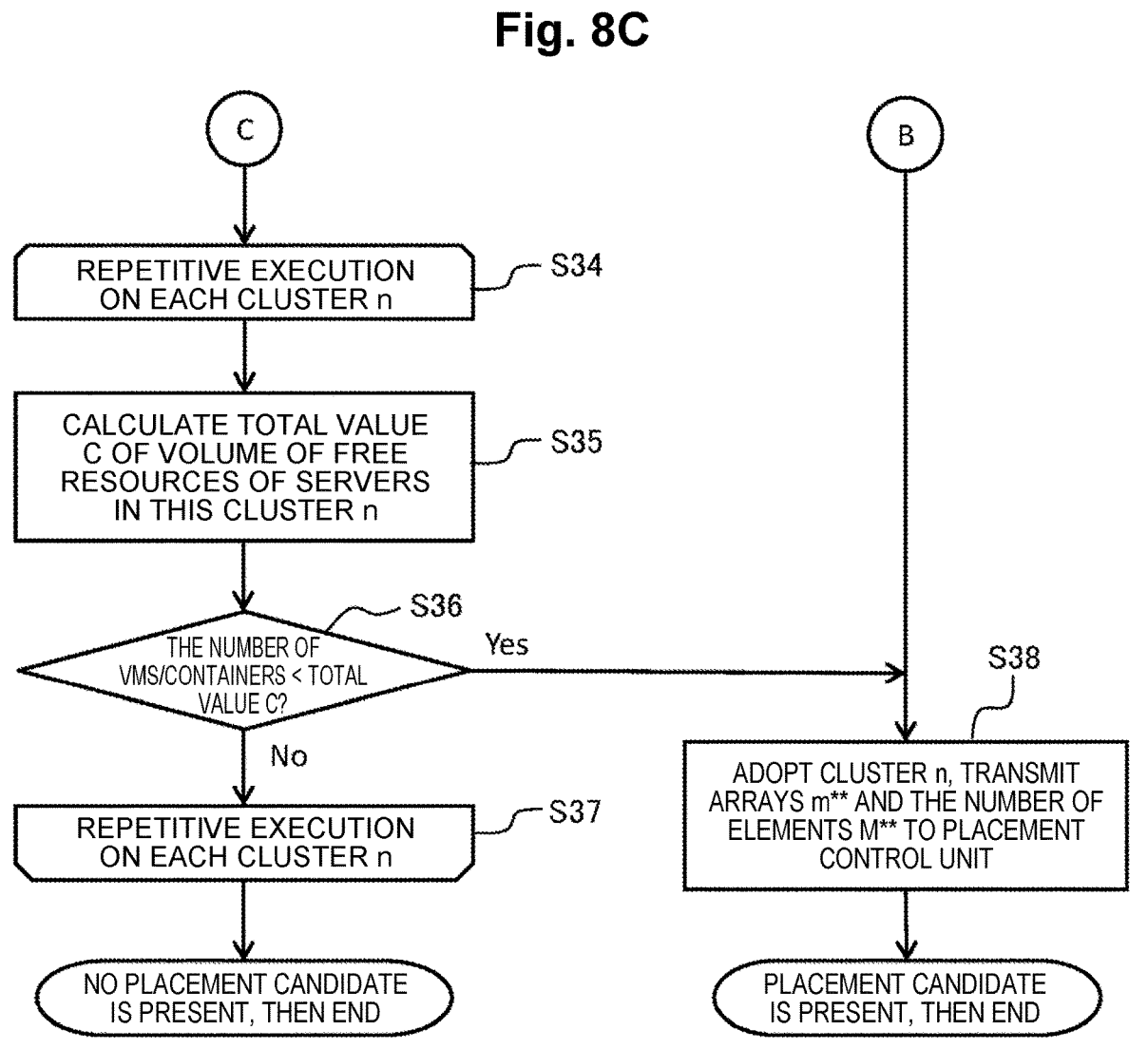

REPETITIVE EXECUTION
ON EACH CLUSTER n — S34

CALCULATE TOTAL VALUE
C OF VOLUME OF FREE
RESOURCES OF SERVERS
IN THIS CLUSTER n — S35

S36

THE NUMBER OF
VMS/CONTAINERS < TOTAL
VALUE C?          Yes

No

REPETITIVE EXECUTION
ON EACH CLUSTER n — S37

S38

ADOPT CLUSTER n, TRANSMIT
ARRAYS m** AND THE NUMBER OF
ELEMENTS M** TO PLACEMENT
CONTROL UNIT

NO PLACEMENT CANDIDATE
IS PRESENT, THEN END

PLACEMENT CANDIDATE
IS PRESENT, THEN END

SERVER GROUP SELECTION SYSTEM, SERVER GROUP SELECTION METHOD, AND PROGRAM

CROSS-REFERENCE TO RELATED APPLICATIONS

This application is a National Stage application under 35 U.S.C. § 371 of International Application No. PCT/JP2020/025170, having an International Filing Date of Jun. 26, 2020.

The disclosure of the prior application is considered part of the disclosure of this application, and is incorporated by reference in its entirety into this application.

TECHNICAL FIELD

The present invention relates to a server group selection system, a server group selection method, and a program.

BACKGROUND ART

There are needs for measures to ensure both performance and availability in service provision using a virtualization platform on a general-purpose server. As one of the measures, a placement control technology for virtual machines (VMs) or containers on physical servers has been proposed.

An example of an optimal placement technology using performance as an objective function includes Patent Literature 1. Patent Literature 1 describes an optimal placement estimation technology for a black box NFV application including a plurality of functions.

Further, an example of the optimal placement technology using availability as an objective function includes Non-patent Literature 1. Non-patent Literature 1 describes a redundancy configuration system and a method of the same.

CITATION LIST

Patent Literature

Patent Literature 1: International Publication No. WO 2009/081736

Non-Patent Literature

Non-Patent Literature 1: A. Zhou et al., "Cloud Service Reliability Enhancement via Virtual Machine Placement Optimization", in IEEE Transactions on Services Computing, vol. 10, no. 6, pp. 902-913, 1 November-December 2017.

SUMMARY OF THE INVENTION

Technical Problem

In these Patent Literature 1 and Non-patent Literature 1, there is a problem that a failure risk of physical servers is not taken into consideration. In consideration of the placement problem, there has been an implicit precondition that physical servers at a placement destination have the same characteristics other than location information (placement location/network topology) and the state of free resources. However, it can be considered that practically, physical servers at a placement destination have different failure risks from each other due to various factors, such as operation time and temperatures. Hence, if placement destinations of virtual machines or containers are selected without taking these factors into consideration, there is a risk that a physical server having a higher failure risk may be selected.

To cope with this, an object of the present invention is to determine a server group as a placement destination based on the failure factors of physical servers.

Means for Solving the Problem

In order to solve the above problem, an invention described in Claim 1 is configured to provide a server group selection system including: a classification unit that classifies a plurality of physical servers into a plurality of clusters based on parameters collected from the physical servers; and a selection unit that selects, from the plurality of clusters classified by the classification unit, any of clusters capable of ensuring resources required for placing virtual machines or containers to be added as a placement destination.

Effects of the Invention

According to the present invention, it is possible to determine a server group as a placement destination based on the failure factors of physical servers.

BRIEF DESCRIPTION OF DRAWINGS

FIG. 2 is a graph of clustering servers on which virtual machines or containers can be installed.

FIG. 3 is a graph of clustering of servers on which virtual machines or containers can be installed, and further filtering the servers based on server placement locations.

FIG. 4 is a server graph of extracting servers on which virtual machines and containers can be installed, and mapping location information of the servers.

FIG. 5 is a graph of selecting a candidate for initial deployment from clusters including servers on which virtual machines or containers can be installed.

FIG. 8A is a flowchart (Part 1) showing a selection method of servers on which virtual machines/containers are installed.

FIG. 8C is a flowchart (Part 3) showing the selection method of servers on which virtual machines/containers are installed.

DESCRIPTION OF EMBODIMENTS

Hereinafter, embodiments for carrying out the present invention will be described in detail with reference to the respective drawings.

Figure 1:
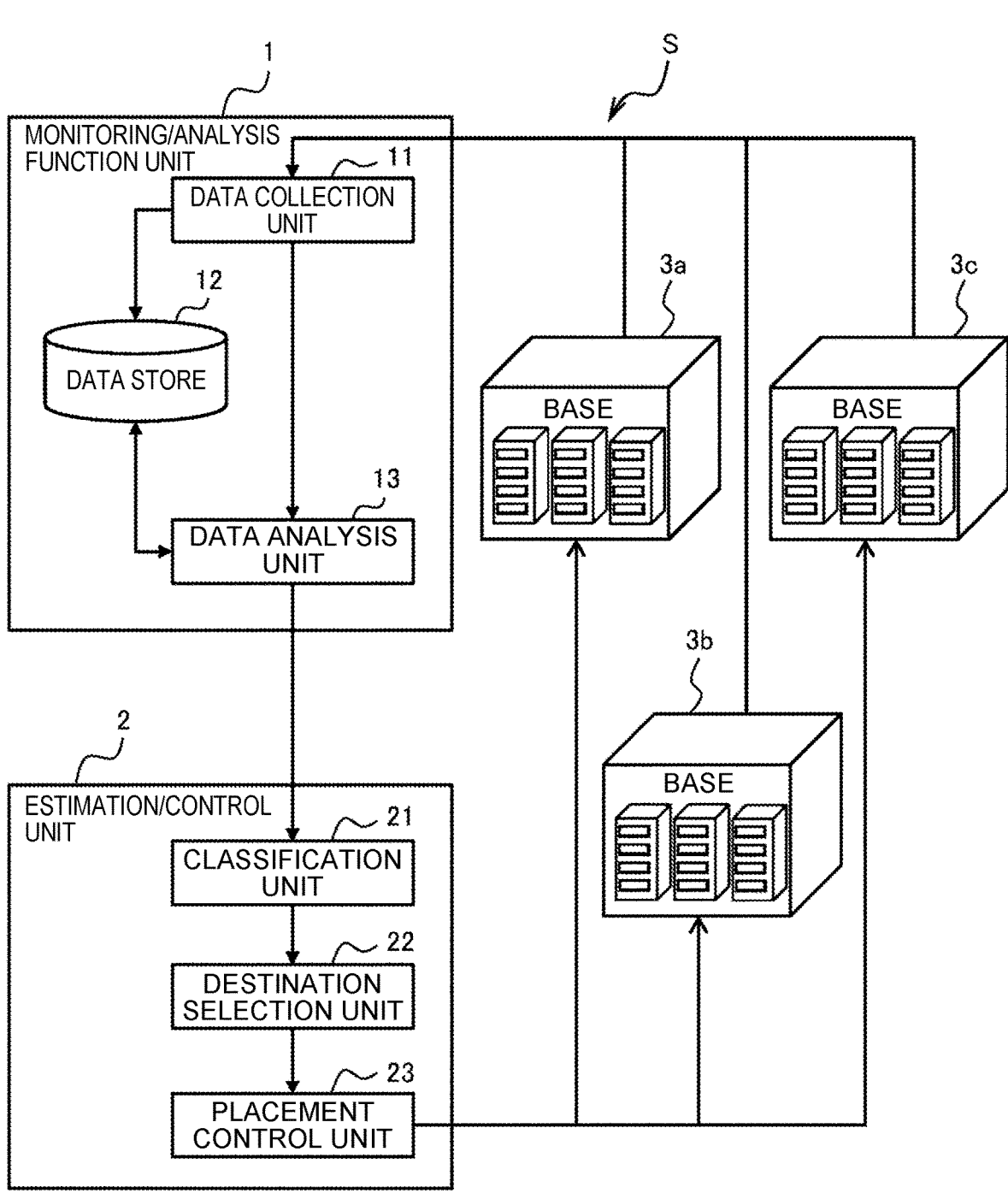
FIG. 1 is a block diagram of a system according to the present embodiment.

FIG. 1 is a block diagram of a system according to the present embodiment.

As shown in FIG. 1, the system S includes a monitoring/analysis function unit 1 and an estimation/control unit 2. For preparation of applying an existing virtual machine/container optimal placement technology, the system S considers individual differences among servers provided in bases 3a to 3c, and determines a group of server candidates at a deployment destination from clusters classified by parameters related to failure factors. In the drawings, virtual machines may be simply referred to as "VMs".

The monitoring/analysis function unit 1 operates on a server different from those of the bases 3a to 3c, and the estimation/control unit 2 exists in each of a plurality of controllers provided on the servers in the bases 3a to 3c.

The monitoring/analysis function unit 1 includes a data collection unit 11, a data store 12, and a data analysis unit 13. The monitoring/analysis function unit 1 monitors the servers provided in the bases 3a to 3c, and collects data from these servers by the data collection unit 11, and also analyzes the information collected from the respective servers by the data analysis unit 13.

The data collected from the servers provided in the bases 3a to 3c by the data collection unit 11 is stored on the data store 12. Data analyzed by the data analysis unit 13 is output to the estimation/control unit 2 described later.

The estimation/control unit 2 includes a classification unit 21, a destination selection unit 22, and a placement control unit 23. The estimation/control unit 2 places a virtual machine or a container to any of the servers. The estimation/control unit 2 uses analysis results of the information on each server input from the monitoring/analysis function unit 1 as an input, selects a server at a placement destination, and places a virtual machine or a container to the selected server.

The classification unit 21 considers the individual differences among the physical servers provided in the bases 3a to 3c, and classifies the physical servers into clusters by parameters related to failure factors of the physical servers. That is, the classification unit 21 classifies the plurality of physical servers into a plurality of clusters based on the parameters collected from the respective physical servers. The information collected from the respective servers by the data analysis unit 13 is input into the classification unit 21, and the clusters that are the server groups classified by the above information are output to the destination selection unit 22.

The destination selection unit 22 selects a cluster that is a server group on which virtual machines or containers are to be placed depending on whether the virtual machines or containers to be newly placed are first ones (initial deployment), second ones (SBY or scale-out), or third ones or later (scale-out). The cluster and the type of the virtual machines or containers to be newly placed are input into the destination selection unit 22, and the cluster that is a server group on which the virtual machines or containers are to be placed is output.

The destination selection unit 22 selects, among a plurality of clusters classified by the classification unit 21, any of clusters that can secure resources necessary for placement of the virtual machines or containers to be added as the placement destination.

The placement control unit 23 places virtual machines or containers in any of the server groups (clusters). To the placement control unit 23, a server group (cluster) on which virtual machines or containers are to be placed is input, and a placement command is output to the servers on which the virtual machines or the containers are to be placed.

The locations of physical servers on which the monitoring/analysis function unit 1 and the estimation/control unit 2 are installed are not limited to specific ones, and these two units do not always have to be in a set.

The physical server group selection method of the present embodiment is used for the classification unit 21 and the destination selection unit 22, and an existing optimal placement technology is applied to the placement control unit 23. Further, the classification unit 21 and the destination selection unit 22 are embodied by execution of a program by a not-shown CPU (central process unit) of a computer.

<<Physical Server Group Selection Method>>

The classification unit 21 classifies the servers by using parameters indicating the characteristics of the respective servers. The classification unit 21 classifies the servers into clusters by using a non-hierarchical clustering method such as a k-means clustering, or a hierarchical clustering method such as a centroid method.

<<Determination Method of Server Group (Cluster) at Placement Destination>>

The cluster determination method differs depending on whether virtual machines or containers as placement targets are first ones (initial deployment), second ones (example: for SBY), or third ones or later (example: scale-out). Considering a risk distribution in the placement of second ones or later, it is configured to select clusters having different characteristics from those of clusters to which already installed virtual machines or containers of the same type belong.

<<Parameters of Server Characteristic Classification>>

The classification unit 21 classifies servers into clusters based on any of information that can be acquired from an OS (operating system), initial information that can be acquired at the time of server installation, and statistical information based on the past operation data, or based on a combination of the above information. Accordingly, the classification unit 21 can classify physical servers into clusters by using only information that can be mechanically acquired, and can evaluate failure probability of a server group included in a cluster.

The information that can be acquired from an OS includes the number of virtual machines that can be installed on a server, the operation time of the server, the write count on a storage, and the temperature indicated by a temperature sensor in the server, and others.

The initial information that can be acquired at the time of server installation includes a base of a data center where a server is installed, the rack number, the rack shelf number, a manufacturer, the manufacturing time period, and the manufacturing lot number of the server, etc.

The statistical information based on the past operation data includes MTBF (mean time between failures), a failure rate curve, and others.

Figure 2:
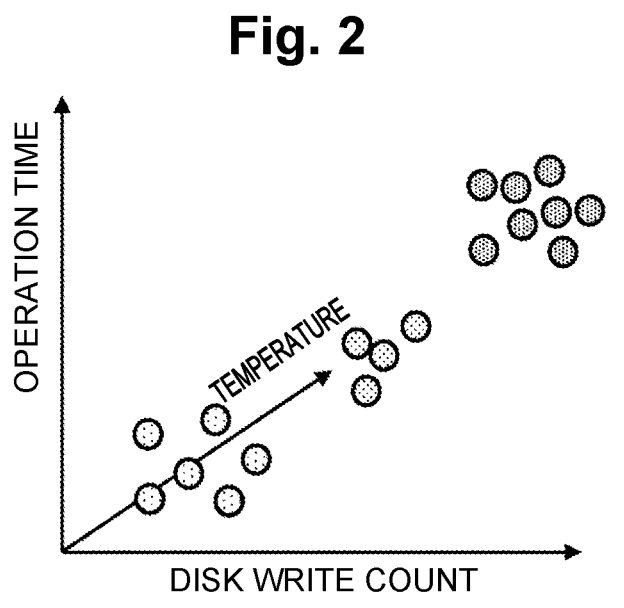

FIG. 2 is a graph of clustering servers on which virtual machines or containers can be installed.

FIG. 2 is a three-axis three-dimensional graph, which includes an axis of the disk write count, an axis of the operation time, and an axis of the temperature. Hence, the respective servers are roughly classified into three types: a cluster having the above parameters that are relatively small; a cluster having the above parameters that are medium; and a cluster having the above parameters that are relatively large. The data collection unit 11 collects data of the disk write count, the operation time, and the temperature of each server, and saves the collected data on the data store 12.

The present invention is not limited to these three axes, and the selected servers may be classified depending on the hardware information and the placement location (bases or racks) of these servers. The servers may be classified into a cluster having biased parameters, such as a larger disk write count, a medium operation time, and a lower temperature, etc.

Server groups belonging to the same cluster have similar parameters of the disk write count, the operation time, and the temperature. Therefore, it is presumed that the server groups are likely to experience failure with the same tendency. These server groups may experience failures at the same time due to the same factors. Hence, in order to enhance availability of service, it is preferable to place virtual machines or containers for the active system and virtual machines or containers for the standby system in servers belonging to different clusters. In addition, it is preferable to place a plurality of virtual machines or containers for scale-out in servers belonging to different clusters as much as possible.

Figure 3:
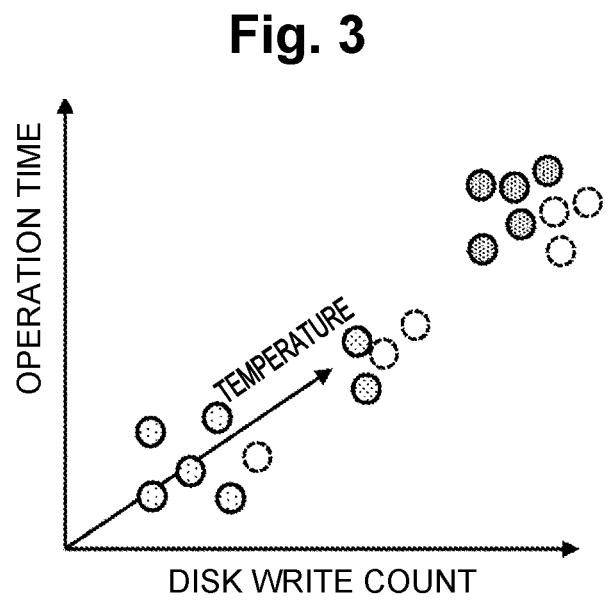

FIG. 3 is a graph of clustering servers on which virtual machines or containers can be installed, and further filtering these servers based on the server placement locations.

Circles indicated by broken lines are servers determined not to be candidates for the placement locations as a result of filtering the servers based on the server placement locations.

Figure 4:
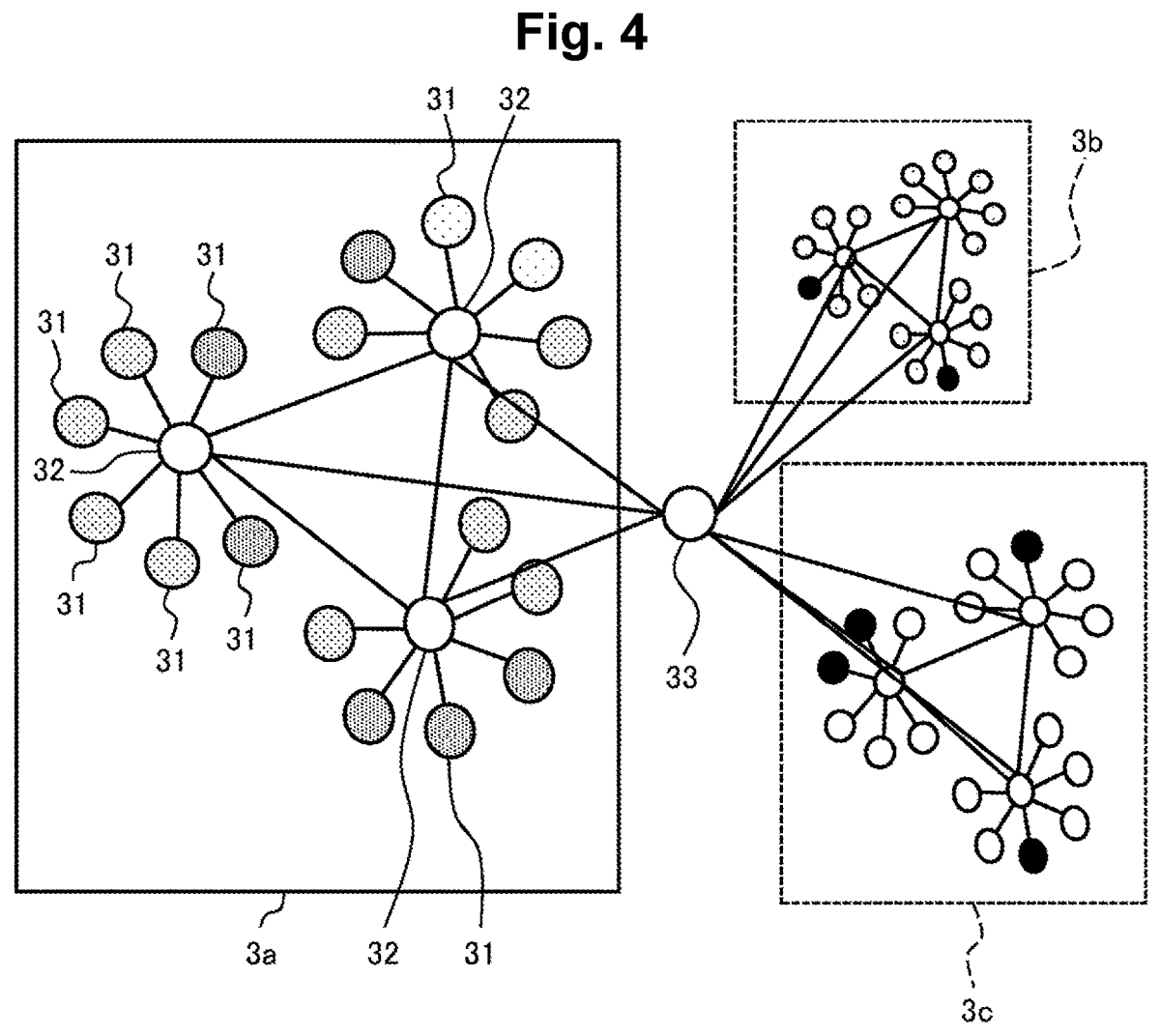

FIG. 4 is a server graph of extracting servers on which virtual machines and containers can be installed, and mapping location information of the servers.

This server graph shows the bases 3a to 3c as rectangles. The base 3a includes a plurality of servers 31 and hubs 32 that star-connect these servers 31. The respective hubs 32 are mutually connected to one another. In each of the other bases 3b, 3c, the connection is provided in the same manner.

The bases 3a to 3c are star-connected via a hubs 33. Accordingly, the bases 3a to 3c form a network.

Since routes between the servers in the same base are short, the communication time between a plurality of virtual machines or containers placed in the servers becomes short. Therefore, it is suitable to place a plurality of virtual machines or containers for scale-out to the servers in the same base.

Figure 5:
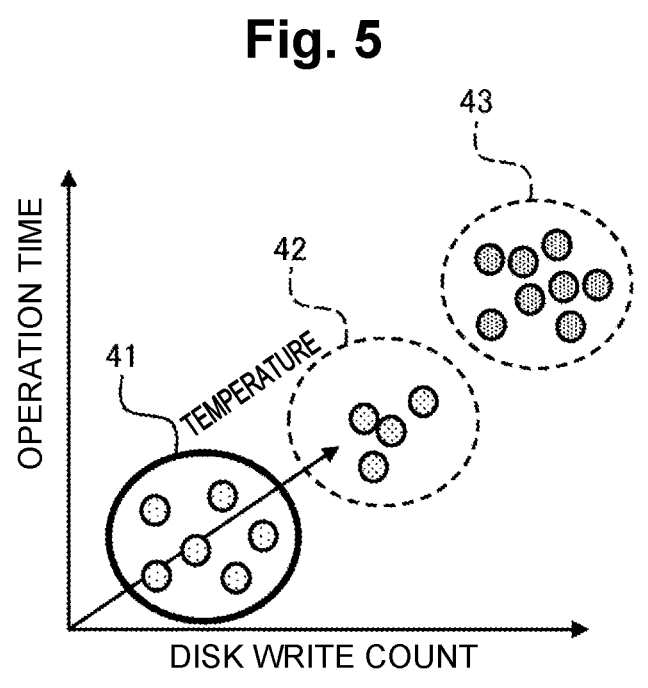

FIG. 5 is a graph of selecting candidates for initial deployment from clusters including servers on which virtual machines or containers can be installed.

A cluster 41 has relatively small parameters of the disk write count, the operation time, and the temperature. A cluster 42 has relatively medium parameters of the disk write count, the operation time, and the temperature. A cluster 43 has relatively large parameters of the disk write count, the operation time, and the temperature. In this case, the cluster 41 is selected as a server group at the placement destination of virtual machines or containers, so that a failure frequency of the virtual machines or containers can be reduced as compared with the cases where the other clusters are selected.

Figure 6:
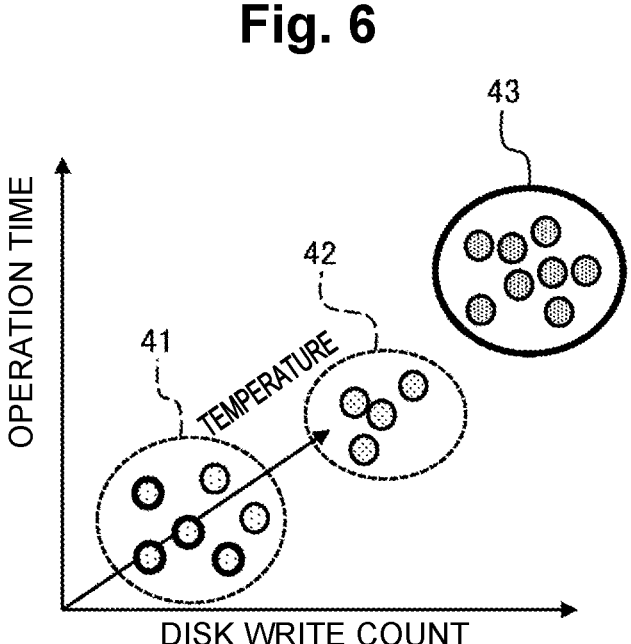
FIG. 6 is a graph of selecting a candidate for redundancy from clusters including servers on which virtual machines or containers can be installed.

FIG. 6 is a graph of selecting a candidate for redundancy from clusters including servers on which virtual machines or containers can be installed.

In the cluster 41, virtual machines or containers for the active system (ACT) are deployed on the servers indicated by thick lines. In this case, either of the clusters 42, 43, which are different from the cluster 41 including servers on which the virtual machines or the containers for the active system (ACT) are installed, may be selected as a deployment destination for virtual machines or containers for the standby system (SBY). This makes it possible to reduce possibility of simultaneous failure between the active system (ACT) and the standby system (SBY) due to the same factor.

Here, description has been provided on the case of selecting a standby system (SBY) candidate for redundancy, and a deployment destination candidate of second virtual machines or containers due to scale-out may be selected in the same manner.

Figure 7:
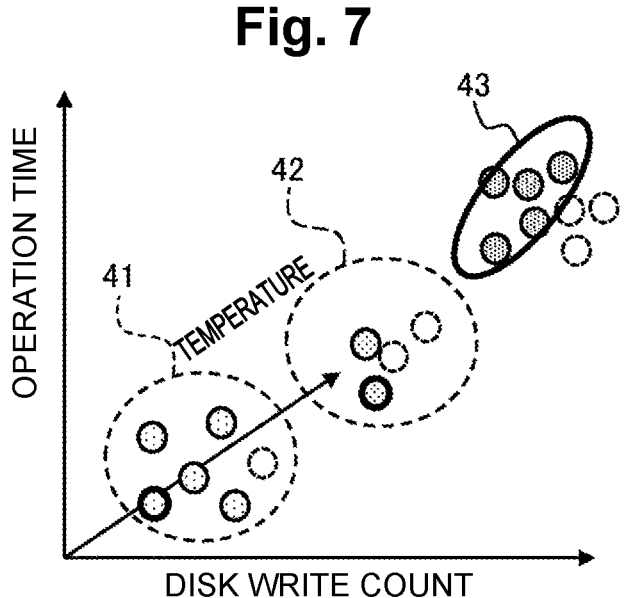
FIG. 7 is a graph of selecting a scale-out candidate from clusters including servers on which virtual machines or containers can be installed.

FIG. 7 is a graph of selecting a scale-out candidate from clusters including servers on which virtual machines or containers can be installed.

The same type of virtual machines or containers for scale-out are deployed on the servers indicated by the thick lines. In this case, the cluster 43, which is different from the clusters 41, 42 that include the servers on which the same type of virtual machines or containers are installed, may be selected as a new deployment destination of virtual machines or containers for scale-out.

Figure 8B:
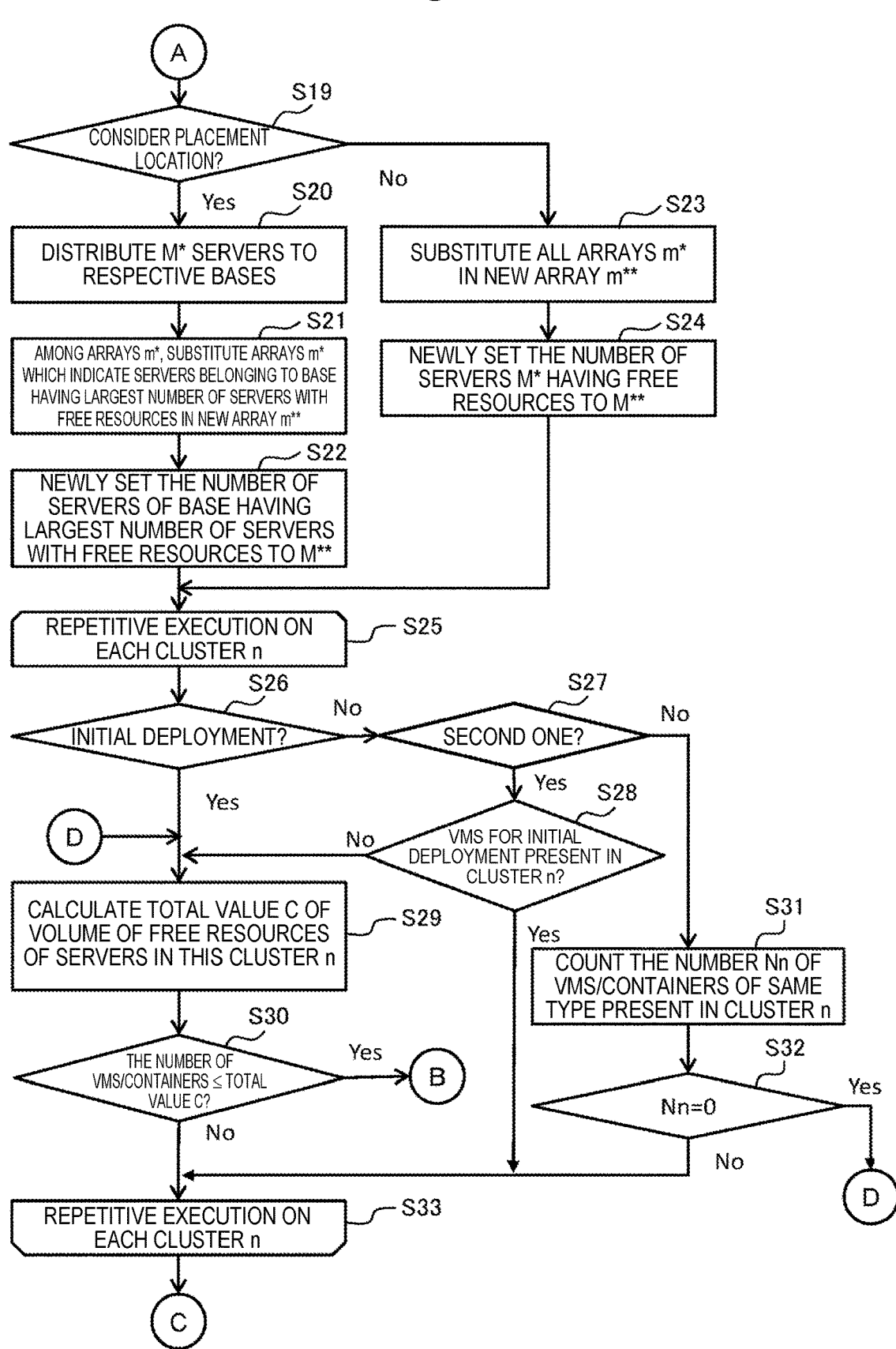
FIG. 8B is a flowchart (Part 2) showing the selection method of servers on which virtual machines/containers are installed.

FIG. 8A to FIG. 8C are flowcharts showing a selection method of servers on which virtual machines or containers are installed.

Steps S10 to S15 are repetitively executed on servers in all data centers.

In step S11, the data analysis unit 13 substitutes each property of this server in a new element of an array m. Properties herein include identification information of a base, the rack number, the server number in the rack, the volume of free resources, the operation time, the disk (storage) write count, and the temperature of the server. Specifically, the volume of free resources of the server includes the number of virtual machines or containers that can be installed thereon. The temperature includes a temperature indicated by a temperature sensor in the server.

In step S12, the data analysis unit 13 determines whether or not the volume of free resources of this server is more than 0. In step S12, the data analysis unit 13 proceeds to step S15 when the volume of free resources of this server is 0 (No).

When the volume of free resources is more than 0 (Yes), the data analysis unit 13 adds a property of this server in a new element of an array m* (S13), and adds 1 to the number of elements M* of this new array m* (S14). When the volume of free resources is 0, the data analysis unit 13 proceeds to step S15.

In step S15, when there is any unprocessed server in the data center, the data analysis unit 13 returns to step S10, and proceeds to step S16 when all the servers are processed.

Steps S16 to S18 are repetitively executed on servers indicated by the arrays m*. Note that servers indicated by the array m* are servers each having free resources enough for installing one or more virtual machines or containers thereon.

In step S17, by using a clustering method such as k-means clustering, the classification unit 21 classifies this server into any of clusters having the cluster numbers x7 of 1 to Nc depending on the disk write count, the operation time, and the temperature of the server. The reference character Nc indicates the number of clusters. The classification unit 21 may also classify a server into a cluster based on any of information that can be acquired from the OS, initial information that can be acquired at the time of installing the server, and statistical information based on the past operation data.

In step S18, the classification unit 21 returns to step S16 when any of the servers indicated by the arrays m* is unprocessed, and proceeds to step S19 of FIG. 8B when the servers in all the arrays m* are processed.

In step S19 of FIG. 8B, the classification unit 21 determines whether or not to consider the placement location. When the placement location is taken into consideration (Yes), the classification unit 21 distributes M* servers to the respective bases (S20). Then, among the arrays m*, the classification unit 21 substitutes arrays m* which indicate servers belonging to a base having the largest number of servers with free resources in a new array m** (S21). In the case of applying a placement control technology taking physical distances among servers into consideration, it is preferable to previously filter the servers by the distance on the server graph.

The classification unit 21 newly sets the number of servers of the base having the largest number of servers with free resources to M** (S22), and then proceeds to the process of step S25.

In step S19 of FIG. 8B, when the placement location is not taken into consideration (No), the classification unit 21 substitutes all the arrays m* in the new array m** (S23), and newly sets the number of servers M* with free resources to M** (S24), and then proceeds to the process of step S25.

That is, the classification unit 21 classifies the physical servers filtered based on the placement locations of the respective physical servers into clusters.

Steps S25 to S33 are repetitively executed on all clusters. When there are a plurality of cluster candidates, a server group is selected as a candidate in ascending order of failure probability, e.g., in ascending order of disk write count, in ascending order of operation time, or in the ascending order of temperature of the servers.

In step S26, the destination selection unit 22 determines whether or not virtual machines or containers to be newly deployed are for initial deployment. When the virtual machines or containers to be newly deployed are for initial deployment (Yes), the destination selection unit 22 calculates a total value C of the volume of free resources of the servers in this cluster n (S29).

Then, in step S30, the destination selection unit 22 determines whether or not the number of virtual machines or containers to be newly deployed is equal to or less than the total value C of the volume of free resources of the servers.

In step S30, the destination selection unit 22 proceeds to step S38 of FIG. 8C when the number of virtual machines or containers to be newly deployed is equal to or less than the total value C of the volume of free resources of the servers (Yes). Then, in step S38, the destination selection unit 22 adopts this cluster n as a deployment destination, transmits the arrays m and the number of elements M to the placement control unit 23, and then ends the process of FIG. 8C.

That is, in the case of initial deployment of virtual machines or containers, the destination selection unit 22 preferentially sets a cluster having a lower failure probability as the placement destination.

In step S30, the destination selection unit 22 proceeds to step S33 when the number of virtual machines or containers to be newly deployed is more than the total value C of the volume of free resources of the servers (No).

In step S26, when the virtual machines or containers to be newly deployed are not for initial deployment (No), the destination selection unit 22 proceeds to step S27 and determines whether or not the virtual machines or containers are second ones.

In step S27, when the virtual machines or containers to be newly deployed are second ones (Yes), the destination selection unit 22 determines whether or not there are virtual machines or containers of the same type that are initially deployed in this cluster n (S28). In FIG. 8B, step S28 is described as "VMs for initial deployment present in cluster n" in an abbreviated manner. When the determination in step S28 is Yes, this case corresponds to the above-mentioned deployment of second ones for redundancy or due to scale-out.

When there is no initially deployed virtual machine or container of the same type in this cluster n, the destination selection unit 22 proceeds to step S29, and sets this cluster n as a deployment target if the volume of free resources of this cluster n is acceptable.

In step S28, when there are initially deployed virtual machines or containers of the same type in this cluster n (Yes), the destination selection unit 22 proceeds to step S33, and does not set this cluster n as a deployment target.

That is, in the case of redundancy for virtual machines or containers, the destination selection unit 22 preferentially sets, as the placement destination, a cluster on which no active virtual machine or container is installed, the cluster having a lower failure probability. Therefore, the destination selection unit 22 can reduce possibility that both the active system and the standby system stop at the same time.

When the virtual machines or containers are second ones for scale-out, the destination selection unit 22 preferentially sets, as the placement destination a cluster on which no first machine or container is installed, the cluster having a lower failure probability. Therefore, the destination selection unit 22 can reduce possibility that two virtual machines or containers of the same type stop at the same time.

In step S27, when the virtual machines or containers to be newly deployed are not second ones (No), the destination selection unit 22 counts the number Nn of virtual machines or containers of the same type present in this cluster n (S31). This case corresponds to third ones or later among the above-described ones for scale-out. When the number Nn of virtual machines or containers of the same type is not 0 (No), the destination selection unit 22 proceeds to step S33, and does not set this cluster n as the deployment target.

When the number Nn of virtual machines or containers of the same type is 0 (Yes), the destination selection unit 22 proceeds to step S29, and when this cluster n is a server group that can secure resources required for the deployment, the destination selection unit 22 sets this cluster as the deployment target.

That is, in the case of scaling virtual machines or containers, the destination selection unit 22 preferentially sets, as the placement destination, a cluster on which no virtual machine or container of the same type is installed, the cluster having a lower failure probability. Therefore, the destination selection unit 22 can reduce possibility that scaled services stop at the same time.

In step S33, the destination selection unit 22 returns to step S25 when there is any unprocessed cluster, and then proceeds to step S34 when all clusters are processed.

Steps S34 to S37 are repetitively executed on all clusters.

The destination selection unit 22 calculates the total value C of the volume of free resources of the servers in this cluster n (S35).

In step S36, the destination selection unit 22 determines whether or not the number of virtual machines or containers to be newly deployed is equal to or less than the total value C of the volume of free resources of the servers. When the number of virtual machines or containers to be newly deployed is equal to or less than the total value C of the volume of free resources of the servers (Yes), the destination selection unit 22 proceeds to step S38 and adopts this cluster n as the deployment destination, and the destination selection unit 22 transmits the arrays m and the number of elements M to the placement control unit 23, and then ends the process of FIG. 8C.

When the number of virtual machines or containers to be newly deployed is more than the total value C of the volume of free resources of the servers, the destination selection unit 22 proceeds to step S37, and does not set this cluster n as the deployment target.

In step S37, the destination selection unit 22 returns to step S34 when there is any unprocessed cluster, and then ends the process of FIG. 8C when all clusters are processed.

Advantageous Effects of the Present Embodiments

The present system selects a server having a lower probability of simultaneous failure when adopting a redundancy configuration for virtual machines or containers. Accordingly, availability of the system is enhanced.

The present system distributes load on physical servers. Accordingly, it is possible to reduce probability that failure occurs at the same time.

Furthermore, by reducing the number of physical server candidates at an installation destination, it is possible to reduce the volume of calculation for optimal placement.

The Present Invention and Advantageous Effects of the Same (1) Provided is a server group selection system including: a classification unit that classifies a plurality of physical servers into a plurality of clusters based on parameters collected from the physical servers; and a selection unit that selects, from the plurality of clusters classified by the classification unit, any of clusters capable of ensuring resources required for placing virtual machines or containers to be added as a placement destination.

With this configuration, it is possible to determine a server group as the placement destination based on the failure factors of the physical servers.

(2) Provided is the server group selection system as set forth in Claim 1, wherein the parameters used when the classification unit classifies the physical servers include any of information capable of being acquired from an OS, initial information capable of being acquired at the time of installing the servers, and statistical information based on past operation data.

With this configuration, it is possible to classify the physical servers into clusters based on information that can be mechanically acquired.

(3) Provided is the server group selection system as set forth in Claim 1 or 2, wherein in the case of initial deployment for the virtual machines or the containers, the selection unit preferentially sets a cluster having a lower failure probability as the placement destination.

With this configuration, it is possible to preferentially set a server group having a lower failure probability as the placement destination.

(4) Provided is the server group selection system as set forth in Claim 1 or 2, wherein in the case of redundancy for the virtual machines or the containers, the selection unit preferentially sets, as the placement destination, a cluster on which no active virtual machine or container is installed, the cluster having a lower failure probability.

With this configuration, it is possible to preferentially set a server group having a lower failure probability as the placement destination, so that the active system and the standby system can be placed in as different clusters as possible. Accordingly, it is possible to reduce probability that both the active system and the standby system stop at the same time.

(5) Provided is the server group selection system as set forth in Claim 1 or 2, wherein in the case of scaling the virtual machines or the containers, the selection unit preferentially sets, as the placement destination, a cluster on which no virtual machine or container of the same type is installed, the cluster having a lower failure probability.

With this configuration, it is possible to preferentially set a server group having a lower failure probability as the placement destination, so that virtual machines or containers of the same type can be placed in as different clusters as possible. Accordingly, it is possible to reduce probability that scaled services stop at the same time.

(6) Provided is the server group selection system as set forth in Claim 1, wherein the classification unit classifies the physical servers filtered based on placement locations of the physical servers into clusters.

With this configuration, only server groups placed at shorter distances can be selected as the placement destination, so that the response time of the system can be reduced.

(7) Provided is a server group selection method including: a step of classifying a plurality of physical servers into a plurality of clusters based on parameters collected from the physical servers; and a step of selecting, from the plurality of clusters, any of clusters capable of ensuring resources required for placing virtual machines or containers to be added as a placement destination.

With this configuration, it is possible to determine a server group as the placement destination based on the failure factors of the physical servers.

(8) Provided is a program for causing a computer to execute: a process of classifying a plurality of physical servers into a plurality of clusters based on parameters collected from the physical servers; and a process of selecting, from the plurality of clusters, any of clusters capable of ensuring resources required for placing virtual machines or containers to be added as a placement destination.

With this configuration, it is possible to determine a server group as the placement destination based on the failure factors of the physical servers.

Modification Examples

The present invention is not limited to the above embodiments, and can be modified without departing from the spirit of the present invention, and there are the following examples (a) to (c).

(a) The method by which the classification unit 21 classifies servers into clusters is not limited to the k-means clustering, and a non-layered clustering method other than this method or a hierarchical clustering method such as a centroid method may be adopted.

(b) The parameters for classifying servers into clusters are not limited to the operation time of the server, the write count on a storage, and the temperatures indicated by the temperature sensors in the servers. The number of virtual machines that can be installed on the servers, the bases of the data centers where the servers are placed, the rack numbers, the rack shelf numbers, the manufacturers, the manufacturing periods, the manufacturing lot numbers of the servers, MTBF (mean time between failures) and failure rate curves of the servers, and others may be also adopted.

(c) The parameters for classifying servers into clusters may include any of information that can be acquired from the OS, initial information that can be acquired at the time of installing the servers, and statistical information based on the past operation data.

REFERENCE SIGNS LIST

S System (server group selection system)
1 Monitoring/analysis function unit
11 Data collection unit
12 Data store
13 Data analysis unit
2 Estimation/control unit
21 Classification unit
22 Destination selection unit (selection unit)
23 Placement control unit
3a Base
3b Base
3c Base
31 Server
32, 33 Hub
41 to 43 Cluster

The invention claimed is:

1. A server group selection system comprising one or more processors configured to perform operations comprising:

collecting, over a network and from each of a plurality of physical servers, parameters indicative of failure probability of the physical server, wherein the parameters comprise (i) a cumulative operation time of the physical server and a cumulative storage write count of the physical server;

performing multi-dimensional clustering to classify the plurality of physical servers into a plurality of clusters based on the parameters collected from the physical servers;

selecting, from the plurality of clusters classified by the classification unit, any of a subset of clusters capable of ensuring that satisfy resource required requirement for placing virtual machines or containers to be added as a placement destination; and deploying the virtual machines or containers on one or more of the physical servers in the selected subset of clusters for execution;

wherein the one or more processors are configured to preferentially set, as the placement destination, a cluster on which no active virtual machine or container is installed, the cluster having a lowest failure probability among the clusters in the plurality of clusters that have no active virtual machine or container installed.

2. The server group selection system according to claim 1, wherein collecting the parameters comprises obtaining values from one or more of (i) an operating system of the physical server, (ii) installation-time information obtained at a time of installing the physical server, or (iii) statistical information based on past operation data.

3. The server group selection system according to claim 1, wherein in a case of initial deployment for the virtual machines or the containers, the one or more processors are configured to preferentially set a cluster having a lowest failure probability as the placement destination among the plurality of clusters.

4. The server group selection system according to claim 1, wherein in a case of redundancy for the virtual machines or the containers, the one or more processors are configured to preferentially set, as the placement destination, a cluster on which no active virtual machine or container is installed, the cluster having a lowest failure probability among the clusters in the plurality of clusters that have no active virtual machine or container installed.

5. The server group selection system according to claim 1, wherein in a case of scaling the virtual machines or the containers, the one or more processors are configured to preferentially set, as the placement destination, a cluster on which no virtual machine or container of the same type is installed, the cluster having a lowest failure probability among the clusters in the plurality of clusters that have no virtual machine or container of the same type installed.

6. The server group selection system according to claim 1, wherein the one or more processors are configured to classify the physical servers filtered based on placement locations of the physical servers into clusters.

7. The server group selection system according to claim 6, wherein the physical placement locations are defined by a network topology comprising a plurality of bases interconnected by one or more hubs, and wherein the filtering comprise s selecting only physical servers located within a single base of the plurality of bases.

8. The server group selection system according to claim 1, wherein the multi-dimensional clustering is performed using a k-means clustering algorithm.

9. The server group selection system according to claim 1, wherein the parameters indicative of failure probability of the physical server further comprises:

(iii) a temperature measured by a sensor of the physical server.

10. A server group selection method performed by a computer system comprising one or more processors, the method comprising:

collecting, over a network and from each of a plurality of physical servers, parameters indicative of failure probability of the physical server, wherein the parameters comprise (i) a cumulative operation time of the physical server and (ii) a cumulative storage write count of the physical server;

performing multi-dimensional clustering to classify the plurality of physical servers into a plurality of clusters based on the parameters collected from the physical servers;

selecting, from the plurality of clusters, a subset of clusters that satisfy resource requirement for placing virtual machines or containers to be added as a placement destination; and deploying the virtual machines or containers on one or more of the physical servers in the selected subset of clusters for execution;

wherein the one or more processors are configured to preferentially set, as the placement destination, a cluster on which no active virtual machine or container is installed, the cluster having a lowest failure probability among the clusters in the plurality of clusters that have no active virtual machine or container installed.

11. The server group selection method according claim 10, wherein collecting the parameters comprises obtaining values from one or more of (i) an operating system of the physical server, (ii) installation-time information obtained at a time of installing the physical server, or (iii) statistical information based on past operation data.

12. The server group selection method according claim 10, further comprising:

in a case of initial deployment for the virtual machines or the containers, preferentially setting a cluster having a lowest failure probability as the placement destination among the plurality of clusters.

13. The server group selection method according claim 10, further comprising:

wherein the operation further comprise:

in a case of redundancy for the virtual machines or the containers, preferentially setting, as the placement destination, a cluster on which no active virtual machine or container is installed, the cluster having a lowest failure probability among the clusters in the plurality of clusters that have no active virtual machine or container installed.

14. The server group selection method according claim 10, further comprising:

in a case of scaling the virtual machines or the containers, preferentially setting, as the placement destination, a cluster on which no virtual machine or container of the same type is installed, the cluster having a lower lowest failure probability among the clusters in the plurality of clusters that have no virtual machine or container of the same type installed.

15. The server group selection method according claim 10, further comprising:

classifying the physical servers filtered based on placement locations of the physical servers into clusters.

16. A non-transitory computer-readable storage medium storing a program for causing a computer comprising one or more processors to execute operations comprising:

collecting, over a network and from each of a plurality of physical servers, parameters indicative of failure probability of the physical server, wherein the parameters comprise (i) a cumulative operation time of the physical server and (ii) a cumulative storage write count of the physical server;

performing multi-dimensional clustering to classify the plurality of physical servers into a plurality of clusters based on the parameters collected from the physical servers;

selecting, from the plurality of clusters, a subset of clusters that satisfy resource requirement for placing virtual machines or containers to be added as a placement destination; and deploying the virtual machines or containers on one or more of the physical servers in the selected subset of clusters for execution;

wherein the one or more processors are configured to preferentially set, as the placement destination, a cluster on which no active virtual machine or container is installed, the cluster having a lowest failure probability among the clusters in the plurality of clusters that have no active virtual machine or container installed.

17. The non-transitory computer-readable storage medium according to claim 16, wherein collecting the parameters comprises obtaining values from one or more of (i) an operating system of the physical server, (ii) installation-time information obtained at a time of installing the physical server, or (iii) statistical information based on past operation data.

18. The non-transitory computer-readable storage medium according to claim 16, wherein the operations further comprise:

in a case of initial deployment for the virtual machines or the containers, preferentially setting a cluster having a lowest failure probability as the placement destination among the plurality of clusters.

19. The non-transitory computer-readable storage medium according to claim 16, wherein the operation further comprise:

in a case of redundancy for the virtual machines or the containers, preferentially setting, as the placement destination, a cluster on which no active virtual machine or container is installed, the cluster having a lowest failure probability among the clusters in the plurality of clusters that have no active virtual machine or container installed.

20. The non-transitory computer-readable storage medium according to claim 16, wherein the operation further comprise:

in a case of scaling the virtual machines or the containers, preferentially setting, as the placement destination, a cluster on which no virtual machine or container of the same type is installed, the cluster having a lowest failure probability among the clusters in the plurality of clusters that have no virtual machine or container of the same type installed.

* * * * *